United States Patent [19]

Betts et al.

[11] Patent Number: 4,517,680

[45] Date of Patent: May 14, 1985

[54] ERROR VECTOR NORMALIZER

[75] Inventors: William Betts, St. Petersburg; Wesley H. Smith, Largo, both of Fla.

[73] Assignee: Paradyne Corporation, Largo, Fla.

[21] Appl. No.: 468,954

[22] Filed: Feb. 23, 1983

[51] Int. Cl.$^3$ ............................................... H04B 1/10
[52] U.S. Cl. ........................................ 375/75; 329/50; 328/166
[58] Field of Search ................... 375/17, 42, 43, 75, 375/79, 80, 94; 328/166; 329/50, 110, 122

[56] References Cited

U.S. PATENT DOCUMENTS

| 3,492,591 | 1/1970 | Shapiro | 328/166 |
| 3,792,364 | 2/1974 | Ananias | 329/50 |
| 4,079,329 | 3/1978 | England et al. | 329/50 |
| 4,090,145 | 5/1978 | Webb | 375/79 |
| 4,112,497 | 9/1978 | Layland et al. | 329/122 |
| 4,266,198 | 5/1981 | Spada | 329/50 |

Primary Examiner—Robert L. Griffin
Assistant Examiner—Stephen Chin
Attorney, Agent, or Firm—Kane, Dalsimer, Kane, Sullivan & Kurucz

[57] ABSTRACT

This invention pertains to a digital modem having a normalizer for normalizing the output of the modem demodulator to a predetermined range. The modem generates a signal vector corresponding to each received signal in a complex plane. The normalizer then generates a normalizing factor corresponding to the radius of the signal vector which then is multiplied with the demodulator output.

4 Claims, 2 Drawing Figures

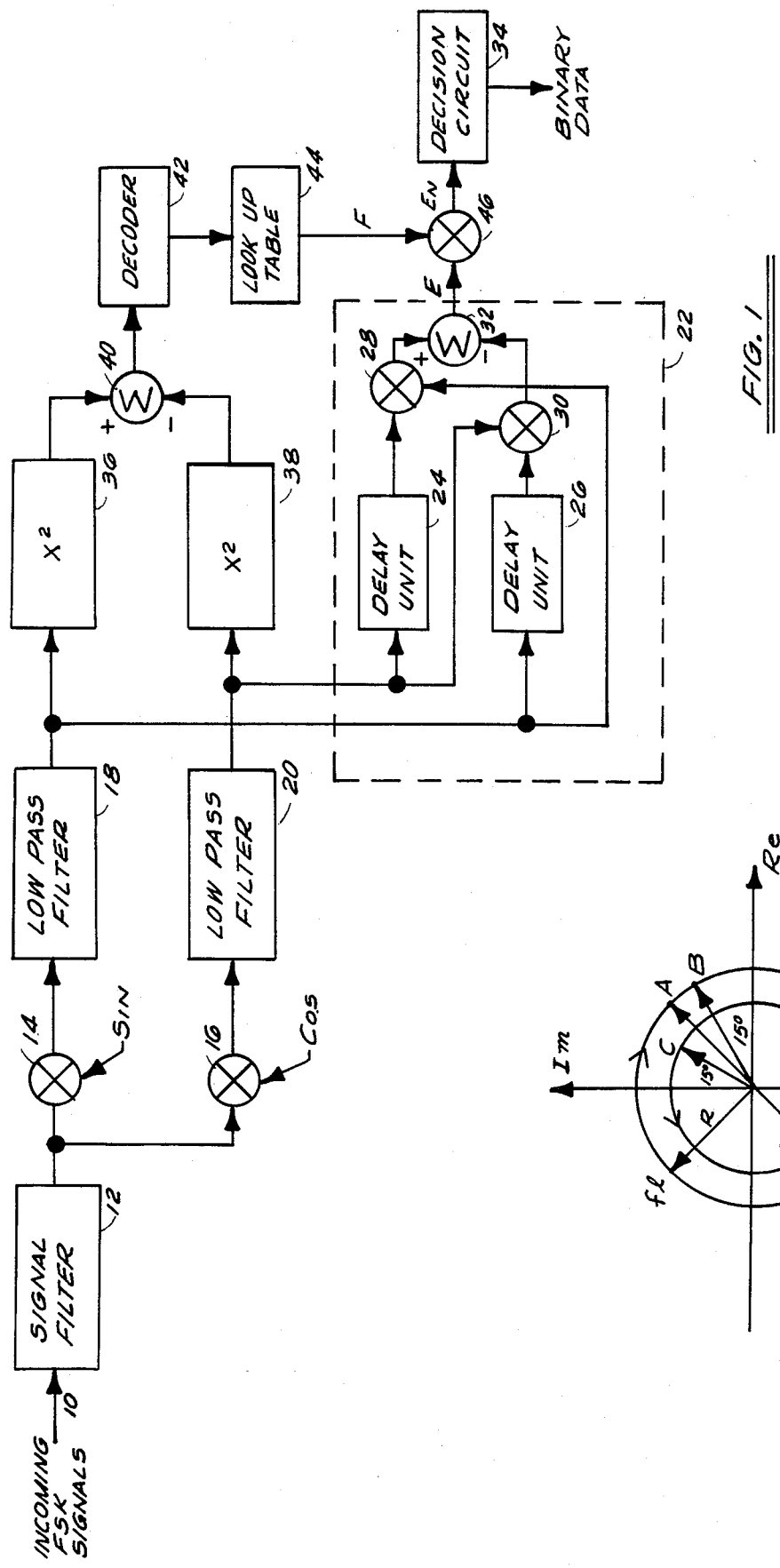

ERROR VECTOR NORMALIZER

BACKGROUND OF THE INVENTION

1. Field of the Invention

This invention pertains to digital data modems and more particularly to a digital data modem in which received data signals are normalized prior to demodulation.

2. Description of the Prior Art

Early data modems comprised analog devices, and therefore both the transmission and receiving of data was done by analog processing of the signals. Recently modems have been built in which substantially all of the signal processing is done by using digital circuits. However many of these digital circuits are used to emulate their analog counterparts. For example many modems include either analog or digital equalizers for processing received data signals, and especially data signals which may be represented as variables on a complex plane and automatic gain controllers. However the functions performed by these circuits can be accomplished faster and more precisely using digital techniques.

OBJECTIVES AND SUMMARY OF THE INVENTION

An objective of the present invention is to provide a modem in which signal equalization is accomplished by normalizing the vectors which represent the signals in a complex plane.

Another objective is to provide a normalizer which may be readily incorporated in a modem using digital signal processing.

Other objectives and advantages of the invention shall become apparent in the course of the invention's description.

According to this invention in a digital communication system, such as a digital modem, in which a signal vector is generated which corresponds to a received signal in a complex plane, a vector normalizer is provided comprising means for deriving the radius of said vector, means for generating a normalizing factor corresponding to said radius, means for demodulating said received signal by processing said signal vector, and multiplying means for multiplying the output of the processing means with the normalizing factor to obtain an output within a predetermined range for all acceptable received signals.

BRIEF DESCRIPTION OF THE DRAWINGS

FIG. 1 shows the invention in conjunction with an FSK demodulator; and

FIG. 2 shows the signal space for said demodulator.

DESCRIPTION OF THE PREFERRED EMBODIMENT OF THE INVENTION

The present invention is described below in conjunction with a particular FSK Demodulator. The FSK Demodulator is the subject of a separate commonly assigned application Ser. No. 457,521, filed Jan. 13, 1983 which is incorporated herein by reference. The FSK Modulated signals received on communication line 10 are filtered by signal filter 12 and then fed simultaneously into two multipliers 14 and 16. In the multipliers the incoming signals are multiplied respectively, by a sine and a cosine wave of a frequency which is preferably equal to the center frequency $f_c$ of the incoming FSK signals. Two low pass filters 18 and 20 are used to eliminate the harmonics produced by the multipliers. The outputs of the filters are, respectively, components of a complex vector representation of the incoming signals which may be mapped on a complex plane.

Under ideal, lossless conditions, the FSK signal appears on a complex plane described above, simply as a rotating vector with a constant angular motion and a fixed radius R. The only difference between a first signal $f_H = f_c + f_1$ and a second signal $f_L = f_c - f_1$ ($f_H$ and $f_L$ being respectively the high and low frequencies of the FSK signal) being the direction of rotation of the vectors. Therefore the FSK signal may be demodulated by establishing the direction of rotation of the signal vector. As described more fully in the above-identified patent application, this may be accomplished by sampling the signal vector at predetermined time intervals $t_1$ and $t_2$ to obtain two vectors $v_1$ and $v_2$. Next, one of the vectors is multiplied by the complex conjugate of the other, and the sign of the imaginary component of the product indicates whether $v_2$, i.e. the second sampled vector is oriented in a clockwise or a counterclockwise direction with respect to the first vector $v_1$.

The above-described operation may be performed by using a circuit such as demodulator section 22 in FIG. 1. In this demodulator the real and imaginary components of the vector signal are fed into two delay units 24 and 26, and the desired imaginary component of the product is formed by multipliers 28, 30, and adder 32. If the output of adder 32 is positive, the vector is rotating in the counterclockwise direaction and therefore the received signal has the higher frequency $f_H$, and if the output is negative the received signal has the frequency $f_L$. The material described so far is the subject matter of the above-identified application.

The output of adder 32 may also be used to discriminate between signals and noise. This output, which from hereon shall be called an error vector E, under idealized conditions, should have a constant magnitude and only its sign should change. Therefore the error vector is fed into a decision circuit 34 which not only generates binary data in accordance with the sign of E but also rejects error vectors which have a magnitude above or below a preselected range. However one problem with this approach is that it does not take into account the variation in the attenuation of the communication channels used to transmit the FSK signals.

It is well known that communication channels attenuate data signals at a rate that is frequency-dependent. This effect is illustrated in FIG. 2. Due to the unequal attenuation mentioned above, signals of a frequency $f_L$ appear on the complex plane as a vector having radius R while signals having a frequency $f_H$ appear on the complex plane as a rotating vector R'. Thus if at times $t_1$ and $t_2$ the received signals have the same frequency $f_L$, then the corresponding vectors A and B have the same radial component R. However if at $t_1$ the incoming signal has frequency $f_L$ and at time $t_2$ the incoming signal has frequency $f_H$ then the corresponding vectors A and C have, respectively, the radial components R and R', as shown. Consequently when the complex multiplication is performed by demodulator 22, the error vector produced does not have the same magnitude as the error vector corresponding to signals A and B. Therefore the error vector must be normalized before it is fed into decision circuit 34. This normalization is accomplished by feeding the real and imaginary components of the signal vectors to two squaring circuits 36 and 38 and then summing the results in adder 40 to obtain a normalizing signal. The output of adder 40 is the sum of the squares of the radial component of the signal vector.

The output of adder 40 is fed into a decoder 42 which generates an address for each of the different values of the adder output. This address is used to look up a normalizing factor $F_1$ in look-up table 44. The normalizing factor is used in multiplier 46 to multiply the error vector produced by the demodulator to produce a normalized error vector $E_n$. Normalized error vector $E_n$ has been adjusted to compensate for the unequal attenuation of the communication channel and is the signal that is actually fed into the decision circuit.

The following example is given to illustrate the invention. Assume that at time $t_1$ the received signal corresponds to signal vector A where $A=0.7+j0.7$. Assume further that $f_H$ is 400 Hz higher than $f_L$ and that the received signals are sampled at 9600 Hz, i.e. the delay units 24 and 26 delay the signals by $1/9600$ Hz $= 0.1042$ ms, and that at $t_2 = t_1 + 0.1042$ ms the received signal corresponds to signal vector B.

Since vector B is rotated clockwise by $(400 \times 360°)/9600 = 15°$, $B = 0.86 + j0.5$ The error vector is therefore $$E(t_2) = 0.7 \times 0.86 - 0.7 \times 0.5 = 0.252$$

For this case since the radius R of $B = 1$, the normalizing factor $F(1) = 1$ and the normalized vector $$E_n(t_2) = 1.$$

If however at $t_2$ the received sigal corresponds to signal vector C, and assuming that the radius of vector C is $R(c) = 0.9$, then $C = 0.45 + j0.774$ and the corresponding error vector is $$E(t_2) = 0.7 \times 0.45 - 0.7 \times 0.774 = -0.227.$$

In this case the corresponding normalizing factor can be chosen to be roughly equal to the reciprocal of the radius, i.e.

$F(0.9) = 1.1$ and the normalized error vector is
$E(t_2) = 0.227 \times 1.1 = -0.249$.

Similarly the normalizing factors for each radius $R' = 0.95, 0.85, 0.8$ etc. can be chosen to be $1/R'$.

Alternatively, if the range of R and R is known, the normalizing factor F can be chosen to be 1 for a radius $R_o = R + R')/2$ in which case for each R greater than $R_o$ F is less than 1 and for each $R'$ smaller than $R_o$, F is greater than 1.

In either case, as long as the signal vector at $t_2$ is rotated either clockwise or counterclockwise by 15° with respect to the signal vector received at $t_1$, the normalized error vector will be around $\pm 0.25$.

The normalizing process could also be accomplished by actually calculating the factor F required to obtain a constant error vector however it was found that it takes much less time if a look-up table is used instead.

The system presented herein is adapted to accept FSK signals such as the ones produced by an FSK signal having an offset frequency or "soft carrier".

Although the normalizing circuit has been described in conjunction with a particular circuit, i.e. a digital FSK demodulator, it is clear that it can be used just as well in conjunction with other circuits. It is to be noted that some receiver modems use Automatic Gain Control (AGC) equipment which have a certain pre-determined range. However the normalizer circuit presented herein produces an output with a much smaller range that said AGC. Therefore the normalizing circuit could be used in series with, or even to replace AGC.

The normalizing circuit presented herein is particularly suited for systems using digital manipulations, especially if these manipulations are arithmetic. In such a system, the normalizer may be implemented with the existing arithmetic circuits without any additional parts.

It is clear that numerous modifications may be made to the present invention without departing from its scope as defined in the appended claims.

We claim:

1. In a modem in which a signal vector is generated which corresponds to a received data signal in a complex plane, a vector normalizer comprising:

means for deriving a normalizing signal indicative of the radius of said signal vector;

means for deriving a normalizing factor from said normalizing signal which depends on the inverse of said radius; and multiplying means for multiplying said signal vector with said normalizing factor to obtain a normalized vector signal.

2. The normalizer of claim 1 wherein said means for generating said normalizing signal comprises:

means for generating the real component of said signal vector;

means for generating the imaginary component of said signal vector;

first squaring means for squaring said real component;

second squaring means for squaring said imaginary component; and means for adding the square of the real and imaginary components.

3. The normalizer of claim 1 wherein said means for deriving a normalizer factor comprises:

a decoding means for generating an address corresponding to said normalizing signal and a look-up means in which normalizing factors are stored and which is adapted to select one of said normalizing factors in accordance with said address.

4. The normalizer of claim 2 wherein said means for deriving a normalizer factor comprises:

a decoding means for generating an address corresponding to said normalizing signal and a look-up means in which normalizing factors are stored and which is adapted to select one of said normalizing factors in accordance with said address.

* * * * *